United States Patent Office 3,277,018
Patented Oct. 4, 1966

3,277,018
SELECTIVE CRACKING CATALYST
Charles J. Plank, Woodbury, and Edward J. Rosinski, Almonesson, N.J., assignors to Mobile Oil Corporation, a corporation of New York
No Drawing. Filed Jan. 24, 1964, Ser. No. 339,866
The portion of the term of the patent subsequent to Feb. 4, 1981, has been disclaimed
5 Claims. (Cl. 252—451)

This application is a continuation-in-part of application Serial No. 17,016, filed Nov. 23, 1960, now U.S. Patent No. 3,120,496.

This invention relates to a new and improved cracking catalyst characterized by unusual ability to selectively crack high molecular weight hydrocarbon oils to lighter material boiling in the range of gasoline. In one embodiment, the invention is concerned with a catalyst composition comprising a crystalline aluminosilicate distributed throughout a matrix composite of silica and alumina wherein interaction of the silica and alumina matrix components is controlled to achieve a highly selective catalyst. In another embodiment, the invention is directed to a method for producing such catalyst.

Various processes relating to the preparation of siliceous cracking catalysts have been described in the laterature. Major effort has been directed to the manufacture of silica-alumina cracking catalysts. Generally, these catalysts have been prepared by activation of naturally occurring silica and alumina-containing clays or by synthetic formulation of composites of silica and alumina. Manufacture of synthetic catalysts has been directed to preparation of composites of silica and alumina to obtain maximum interaction of the alumina with the silica. Such purpose has generally been accomplished by reaction of alumina-producing solutions and silica-producing solutions together under conditions to achieve the formation of an intimate cogelled admixture of silica and alumina.

In accordance with the present invention, there has been discovered an improved cracking catalyst comprising a crystalline aluminosilicate and a porous matrix consisting essentially of silica and alumina wherein interaction between the silica and alumina matrix components is controlled. Control is directed, in contradistinction to previous methods for preparing synthetic silica-alumina matrix composites, to minimize the content of cogelled alumina. The enhanced selectivity of the cracking catalyst is dependent on deriving major catalytic activity from the crystalline aluminosilicate as well as from the matrix composite of silica-alumina created by the interaction of silica with alumina at a multitude of particle interfaces.

The present invention is concerned, in one aspect, with a method for preparation of a catalyst composition comprising a crystalline aluminosilicate distributed throughout a porous matrix composite of silica-alumina wherein the matrix is prepared by dispersing in a silica sol, an amount, corresponding to between about 5 and about 40 percent by weight of the resulting dry composite, of a finely divided porous material characterized by a surface area of at least 25 square meters per gram, selected from alumina and composites of silica and alumina containing at least about 40 weight percent alumina, which material has a weight mean particle diameter of between 1 and 5 microns, the concentrations and proportions of reactants being such that the resulting silica sol having the afore- mentioned finely divided material dispersed therein has a pH of between 6 and 11 and an alumina content, corresponding to cogelled alumina, as hereinafter defined, in the resulting dry composite, of less than about 1.5 weight percent, permitting the resulting sol to set to a hydrogel, activating the resulting hydrogel, washing the hydrogel free of water-soluble matter, drying and calcining.

In another embodiment, the present invention is directed to a method for preparing the above catalyst in the form of spheroids.

In still another embodiment, the invention described herein is concerned with the selective cracking catalyst obtained in accordance with the foregoing process.

Thus, pursuant to the teachings of this invention, it has been discovered that a silica-alumina matrix composite having unusual selective cracking ability may be prepared by incorporating in a silica sol a quantity of solid powdered alumina or silica-alumina composite, containing at least about 40 weight percent alumina, having a weight mean particle diameter of between 1 and 5 microns. The amount of such powdered material so introduced is generally between about 5 and about 40 percent by weight and preferably between about 10 and about 30 percent by weight of the resulting dry product. The concentrations and proportions of reactants are such that the resulting silica sol having the above powdered material dispersed therein has a pH of between 6 and 11 and an alumina content corresponding to cogelled alumina in the final calcined product, of less than 1.5 weight percent. It has been found that the hydrogel product resulting from the setting of a silica sol containing powdered material of the aforementioned composition and particle diameter upon being subjected to subsequent activation treatment and thereafter washed free of soluble matter, dried and calcined at a temperature below the fusion point of the powdered material provided an excellent matrix component for use with active crystalline aluminosilicates dispersed, combined or otherwise admixed therewith, whereby the total catalyst composite has the unusual ability to selectively crack high molecular weight hydrocarbon oils to lighter materials boiling in the range of gasoline.

It is a critical feature that the cogelled alumina content, as hereinafter defined, of the silica-alumina matrix composite be less than about 1.5 percent by weight. The amount of completely interacted or cogelled alumina is designated herein as that portion of alumina in the ultimate catalyst which is insoluble in a 67 weight percent aqueous solution of sulfuric acid at a temperature of 245–248° F. when treated for a period of 24 hours. In contradistinction to the present matrix, conventional commercial synthetic silica-alumina composites contain 3 to 5 weight percent of completely combined, i.e. insoluble, alumina determined under the above conditions.

In preparation of the silica-alumina matrix a silica hydrosol is prepared containing between about 5 and about 40 percent by weight of a powdered porous material having a weight mean particle diameter of 1 to 5 microns and a surface area of at least 25 m.²/g. and consisting of alumina or a silica-alumina composite having an alumina content of at least about 40 weight percent. The above particle size is an essential factor in affording a suitable matrix. The powdered material may be added by dispersing in an already prepared silica hydrosol or, as is preferable where the hydrosol is characterized by a short time of gelation, the powder may be added to one or more of the reactants used in forming the hydrosol or may be admixed in the form of a separate stream with streams of the hydrosol-forming reactants in a mixing nozzle or other means where the reactants are brought into intimate contact. The powder may also be introduced into the hydrosol by the formation in situ of a finely divided alumina precipitate in one or more of the reactant streams by contacting appropriate chemicals either dissolved in reactant streams or in separate streams. Likewise, an alumina-containing powder may be introduced in an already prepared hydrosol by dispersing therein materials which will form a finely divided precipitate. The latter methods in which a precipitate is formed in the hydrosol or in reactants used in preparation thereof have generally not been found to be as desirable as the addition of alumina-containing powder which has been previously ground to the requisite particle size and thereafter introduced into the hydrosol or during the course of hydrosol formation since, as noted hereinabove, close control of the particle size of the added aluminous material in the range of 1 to 5 microns is essential to the success of the present process. As a general rule, it has been found that the particle size of the added aluminous material may be controlled with greater accuracy by grinding than by precipitation, although it is to be understood that the present process contemplates the incorporation of the described powdered material in a silica hydrosol employing any of the foregoing or other feasible techniques.

It is preferred to disperse the fine aluminous particles in the acid solution and to subsequently admix such solution with the silicate reactant solution. Under such conditions, the reaction time between the fine particles and acid solution is maintained at a minimum, i.e., less than one hour, to prevent excessive solution of the fine aluminous particles which would lead to the formation of undesired cogelled silica-alumina component. Without being limited by any theory, it would appear that when contact between the finely divided aluminous particles and acid solution takes place, some reaction occurs resulting in the formation of reactive alumina interfaces on the particles. Such interfaces react with the silica component during gelation. Subsequent activation of the hydrogel serves to create silica-alumina sites on the surfaces of the aluminous particles. The particular type of silica-alumina site, so formed, appears to be active, stable and more selective than the silica-alumina catalytic site formed by cogellation in accordance with conventional preparation.

The silica hydrosol initially formed may be produced by well known methods of reaction between an acid and a silicate. The acid employed may be any of those heretofore utilized in preparation of silica hydrosols such as, for example, sulfuric, hydrochloric, nitric, acetic, phosphoric, etc. Of these, the mineral acids are preferred. Particular preference is accorded sulfuric acid. The silicate reactant may be an organic silicate, such as ethyl ortho silicate or an inorganic alkali metal silicate. The alkali metal silicate reactant used in the preparation of the present catalysts is generally sodium silicate but it is contemplated that other alkali metal silicates such as potassium silicate may, likewise, be used.

The alumina-containing powder employed may be any porous alumina having a surface area in excess of 25 square meters per gram and preferably greater than 50 square meters per gram. Alumina in various phases or mixtures of phases may be employed. Thus, alpha alumina, eta alumina, gamma alumina, chi alumina, bauxite in anhydrous or various hydrated forms may be utilized. Highly calcined forms of alumina which are substantially devoid of porous structure and do not possess the requisite above minimum surface area are not satisfactory for use in the present process. The alumina-containing powder may also be a composite of alumina with silica such as in naturally occurring deposits of clay, kaolin, minerals, etc., or synthetic composites of silica and alumina including, for example, cogelled or coprecipitated silica and alumina. Also composites of silica impregnated with alumina or alumina impregnated with silica may be used. The alumina content of such composites should be appreciable and, in general, at least 40 weight percent.

The particle size distribution of the aluminous powder introduced into the silica hydrosol is determined by sedimentation methods. The weight mean particle diameters were determined by plotting the cumulative percent of alumina-containing powder smaller than a given diameter against particle diameter, dividing the total size range into a number of small fractions and calculating as follows:

$$\text{Weight mean diameter} = \frac{\sum d_i g_i}{\sum g_i}$$

wherein $d_i$ is the mean particle size of the fraction in microns and $g_i$ is the corresponding weight percent material in the fraction.

In addition to having the above-noted particle size, the aluminous powder incorporated in the silica hydrosol should necessarily be only slightly soluble therein and should further be characterized by being infusible at the hydrogel drying and calcining temperatures. The form of hydrogel is necessarily maintained substantially constant from a time prior to gelation until after the gel has been dried. During drying, the hydrogel undergoes considerable shrinkage. The drying is carried to a stage beyond that at which maximum shrinkage of the gel is obtained. The gel, after syneresis or shrinkage thereof has been completed, is substantially dry, that is, the gel possesses open pores free of liquid although it still contains a relatively small percentage of water which is evolved upon subjecting the gel to a relatively high temperature. Hydrogel containing powdered aluminum-containing powder dispersed therein prepared as in the present process may be dried at room temperatures or at higher temperatures in air or steam as well as in various inert or reducing atmospheres. While the prepared hydrogel may be dried at ambient temperature by merely exposing to the air, it is preferred to accelerate the removal of liquid content from the hydrogel by drying at a temperature in the range of about 150° F. to about 400° F. until shrinkage of the hydrogel is substantially complete. Drying may be carried out in air or super-heated steam. Calcination of the dried gel may be effected in an inert gas, air, steam or mixtures thereof at a temperature below that at which sintering is encountered and generally in the approximate range of 1150° F. to 1400° F. for a period of about 1 hour or more, generally from about 1 hour to about 24 hours.

The silica hydrosol containing finely divided dispersed alumina-containing powder is characterized by a pH within the approximate range of 6 to 11 and more particularly within the range of 7 to 9.5. The latter pH range has been found to be especially applicable when the hydrosol is formed into spheroidal hydrogel particles in accordance with techniques described hereinafter.

The aluminosilicates used for purposes of the invention are essentially crystalline or cryptocrystalline aluminosilicates, characterized by rigidity of structure, which contain at least 0.5 equivalents, and preferably 0.9±0.1 equivalent, per gram atom of aluminum, of ions of positive valence comprising: (1) hydrogen ions or non-metallic ions capable of conversion thereto, e.g., ammonium ions; (2) metallic cations of metals selected from Groups IB through VIII of the Periodic Table, alone or in combination with hydrogen ions or ions capable of conversion thereto; or (3) metal cations wherein at least 50% and preferably more than at least 75% of the total equivalents are cations of at least one rare earth metal. In general, the compositions are prepared by treating a suitable precursor aluminosilicate with a fluid medium containing a source of hydrogen ions, hydrogen ion precursors, e.g., ammonium chloride, tetramethylammonium hydroxide, etc., and/or a metallic salt of the desired metal cation.

Alternatively, the precursor aluminosilicate may be incorporated in the matrix composite and then base exchanged with the desired cations.

The aluminosilicates are preferably prepared by treatment of a precursor aluminosilicate with an aqueous medium, the pH of which will vary depending upon the precursor aluminosilicate and its atomic array of silicon and aluminum. Where the aluminosilicate precursor material has an atomic ratio of silicon to aluminum greater than about 2.7, the fluid medium may contain a hydrogen ion, metal cation, ammonium ion, or a mixture thereof, equivalent to a pH value ranging from less than 1.0 up to a pH value of about 12.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0, and are preferably within the range of less than 1.0 up to 4.5. Where the atomic ratio is greater than about 1.1 and less than about 2.7, the pH value for the fluid media containing a hydrogen ion or a metal cation ranges from 3.8 to 8.5. Where ammonium ions are employed, either alone or in combination with metallic cations, the pH value ranges from 4.5 to 8.5. When the aluminosilicate material has an atomic ratio of silicon to aluminum less than about 1.5, the preferred medium is a fluid medium containing an ammonium ion instead of a hydrogen ion.

In carrying out the treatment with the fluid medium, the procedure employed comprises contacting the aluminosilicate with the desired fluid medium or media until such time as any alkali metal cations originally present in the aluminosilicate are replaced or partially replaced with the desired ions to the extent that the total equivalents of alkali are reduced by an amount of at least 10 percent, preferably 50 percent or more, and more desirably until substantially all of the total equivalents of alkali are replaced. Alkali metal cations, if present in the modified aluminosilicate to an extent greater than 0.25 equivalent tend to suppress or limit catalytic properties, the activity of which, as a general rule, decreases with increasing content of these metallic cations. Effective treatment with the fluid medium to obtain aluminosilicates having high catalytic activity will vary with the duration of the treatment and temperature at which it is carried out. Such treatments are also governed by equilibrium considerations. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 4 and 8, and is essentially free of cations. The resulting product is thereafter dried to remove the liquid water phase and preferbaly activated by heating at temperatures ranging from 400° F. to 1500° F.

The aluminosilicate compositions may be analyzed for metallic ion content by methods well known in the art. Analysis may also be made by analyzing the effluent wash for cations.

The actual procedure employed for carrying out the fluid treatment of the aluminosilicate may be accomplished in a batchwise or continuous method under atmospheric, subatmospheric, or superatmospheric pressure. A solution of the ions of positive valence in the form of a molten material, vapor, aqueous or non-aqueous solution, may be passed slowly through a fixed bed of the aluminosilicate precursor material. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the material employed is below the decomposition temperature of the particular aluminosilicate employed.

A wide variety of acidic compounds can be employed with facility as a source of hydrogen ions and include both inorganic and organic acids.

Representative inorganic acids which can be employed include acids such as hydrochloric acid, nitric acid, carbonic acid, phosphorous acid, phosphoric acid, and the like.

Typical organic acids which find utility in the practice of the invention can include monocarboxylic, dicarboxylic and polycarboxylic acids which can be aliphatic, aromatic or cycloaliphatic in nature.

Still other classes of compounds which can be employed are ammonium compounds or substituted ammonium compounds, amines, amine complexes and phosphorus analogs thereof which can be decomposed or oxidized to provide hydrogen ions when an aluminosilicate treated with a solution of said compound is subjected to temperatures below the decomposition temperature of the particular aluminosilicate.

Representative ammonium compounds which can be employed include ammonium chlirode, ammonium hydroxide and ammonium sulfate. Still other ammonium compounds which can be employed include tetraalkyl and tetraaryl ammonium salts such as tetramethylammonium hydroxide, and trimethylammonium hydroxide. Other compounds which can be employed are nitrogen bases such as guanidine, pyridine, quinoline, etc., and strongly basic water soluble amines such as hydrazine, methylamine, ethylenediamine, tetramethylammonium hydroxide and the like.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates, sulfates, sulfides, thiocyanates, and the like. The only limitations on the particular metal salt or salts employed include: that it be effectively soluble in the fluid medium to provide ion transfer and be compatible with the hydrogen ion source, especially if both the metallic salt and the hydrogen ion source are in the same fluid medium, and that the resulting ionic form of the aluminosilicate shall have a stable crystalline or cryptocrystalline structure. The preferred salts are the chlorides, nitrates, acetates and sulfates.

Of a wide variety of metallic salts which can be employed, the most preferred are salts of trivalent metals, then of divalent metals and lastly, of monovalent metals. Of the divalent metals, the preferred materials are of Group IIA of the Periodic Table. The preferred trivalent salts are those of the rare earth metals which includes cerium, lanthanum, praseodymium, neodymium, samarium, europium, gadolinium, terbium, dysprosium, holmium, erbium, thulium, ytterbium, lutetium, yttrium, and scandium.

The rare earth salts employed can either be the salt of a single metal or preferably of mixtures of metals such as rare earth chlorides or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium, and yttrium. Rare earth chlorides are commercially available and a representative mixture contains the chlorides of a rare earth mixture having the approximate relative composition: cerium (as $CeO_2$) 48% by weight, lanthanum (as $La_2O_3$) 24% by weight, praseodymium (as $Pr_6O_{11}$) 6% by weight, neodymium (as $Nd_2O_3$) 19% by weight, samarium (as $Sm_2O_3$) 2% by weight, gadolinium (as $Gd_2O_3$) 0.7% by weight, others+yttrium (as $Y_2O_3$) 0.2% by weight. Didymium chloride is also a mixture of rare earth chlorides, but having a low cerium content. A representative mixture consists approximately of the following rare earths determined as oxides: lanthanum, 46% by weight; cerium, 1% by weight; praseodymium, 10% by weight; neodymium, 32% by weight; samarium, 6% by weight; gadolinium, 3% by weight; yttrium, 0.4% by weight; other rare earths 1% by weight. It is to be understood that other mixtures of rare earths are equally applicable in the instant invention.

Representative metal compounds which can be employed, aside from the mixtures mentioned above, include silver sulfate, calcium chloride, beryllium bromide, barium chloride, barium hydroxide, manganous acetate, magnesium sulfate, zinc sulfate, aluminum chloride, titanium chloride, zirconium nitrate, chromic nitrate, ferric acetate, ferrous chloride, nickel chloride, cerous acetate, lanthanum chloride, yttrium chloride, samarium sulfate, neodymium chloride, praseodymium chloride, praseodymium sulfate, etc.

The metal aluminosilicate precursor materials include a wide variety of natural and synthetic aluminosilicates which may be represented in their hydrated form by the formula:

$$M_{2/n}O:Al_2O_3:wSiO_2:yH_2O$$

wherein M is a metal cation, $n$ represents the valence of the cation, $w$ is a number representing the average moles of silica, and $y$ the moles of water per mole of $Al_2O_3$. The cation may be any one or more of a number of metal ions. The aluminosilicate may be synthesized or it may occur naturally. Typical cations include sodium, lithium, potassium, silver, magnesium, calcium, zinc, barium, iron and manganese. The atomic ratio of silicon to aluminum ($w$) in these compositions may vary depending upon whether the aluminosilicate is a natural material, such as mordenite, chabazite, gmelinite or ptilolite, or on the method by which it is synthesized. The main characteristic of these materials is the presence in their molecular structure of at least 0.5 equivalent and usually 0.9±0.1 equivalent of an ion of positive valence per gram atom of aluminum and an ability to undergo dehydration without substantially affecting the spatial arrangement of inorganic oxides within their dimensional framework.

Typical precursor materials may be chosen from the known synthesized crystalline aluminosilicates which have been designated as zeolites X, A, Y, L, D, R, S, T, Z, E, F, Q and B.

Other synthesized crystalline aluminosilicates include those designated as ZK–4 and ZK–5.

ZK–4 can be represented in terms of mole ratios of oxides as:

0.1 to $0.3R:0.7$ to $1.0$ $M_{2/n}O:Al_2O_3:2.5$ to $4.0$ $SiO_2:y$ $H_2O$ wherein R is a member selected from the group consisting of methylammonium oxide, hydrogen oxide and mixtures thereof with one another, M is a metal cation having a valence of $n$, and $y$ is any value from about 3.5 to 5.5.

ZK–5 can be represented in terms of mole ratios of oxides as:

0.3 to 0.7 $R_{2/m}O:0.3$ to 0.7 $M_{2/n}O$
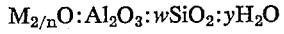
$:Al_2O_3:4.0$ to $6.0$ $SiO_2:y$ $H_2O$ wherein R is selected from the group consisting of a nitrogen-containing cation derived from N,N'-dimethyltriethylene diammonium ion and mixtures of said cation with hydrogen, and $m$ is the valence thereof; M is a metal and $n$ the valence thereof, and $y$ is any value from 6 to about 10.

Among the naturally occurring crystalline aluminosilicates which can be employed for purposes of the invention are included faujasite, heulandite, clinoptilolite, chabazite, gmelinite, mordenite, dachiardite, and erionite.

Other aluminosilicates which can be used as precursor materials are caustic treated clays.

It is to be understood that, although reference has been made to aluminosilicates as precursor materials, it is intended to include other materials which have an analagous structure to aluminosilicates resulting from isomorphous substitution of some or all of the atoms of aluminum or silicon with other elements, e.g., substitution of germanium for silicon and/or gallium for aluminum.

Preferred crystalline aluminosilicates for use in accordance with the invention have atomic ratios of silicon to aluminum of about 1.2 or greater, and preferably greater than about 2.0. Preferred materials thus are derived from precursor aluminosilicates such as mordenite and zeolites X, Y, T and ZK–5. These and other useful aluminosilicates are further characterized by their sorption capacity of at least about 4 weight percent normal butane at 760 mm. and 25° C.

The crystalline aluminosilicates prepared in the foregoing manner are dispersed, combined or otherwise admixed with the silica-alumina matrix in an amount ranging from 1 to 95 percent by weight, preferably about 2 to 80 percent by weight, based on the total weight of the final catalyst composition. The aluminosilicate, usually in powdered or granular form, may be added to a prepared silica hydrosol, one of the reactants used in forming the hydrosol, e.g., the silicate solution, or may be added in the form of a separate stream with streams of the hydrosol-forming reactants in a mixing nozzle or other means whereby the reactants are brought into intimate contact. Likewise the aluminosilicate may also be introduced into an already prepared silica-alumina matrix by blending or otherwise intimately associating the materials in a ball mill, pulverizer, muller mixer, or other suitable grinding device, to a size suitable for their intended use. Conventional pelleting or pilling techniques may be utilized in forming the material into spheres, cylindrical pellets, and the like, in sizes from $\frac{1}{16}''$ diameter to 200–500 mesh. The blending operation can be effected with dry materials or in the presence of water or other suitable liquid which is non-harmful to either the crystalline aluminosilicate or silica-alumina matrix.

The resulting silica-alumina matrix containing crystalline aluminosilicate dispersed therein is subjected to activation by treatment with heat in an acidic solution or by base exchange with an aqueous solution containing an ion capable of replacing zeolitic alkali metal. The heat treatment is carried out with an acidic solution having a pH less than about 5 at a temperature between about 150 and about 220° F. for a period extending from ½ hour to 48 hours, depending on the nature and concentration of the acidic treating solution. It is preferred to utilize a dilute aqueous treating solution containing less than about 10 percent by weight of the acidic compound. Both acids and acid salts may be employed as the acidic compound. More particularly, it has been found that when an acid solution is employed, the period of treatment should be within the approximate range of ½ to 24 hours and when an acid salt solution is employed the period of treatment should extend from 8 to 48 hours. While any acid or acid salt which does not adversely affect the catalytic properties of the resulting product may apparently be employed, a mineral acid, and particularly sulfuric acid, is preferred among the acids and ammonium and aluminum acid salts are preferred among the acid salts.

Base exchange is accomplished with a suitable aqueous solution containing an ion capable of replacing any zeolitic alkali metal, which ion does not detrimentally affect the finished catalyst. The base exchange step is carried out for a period of time sufficient to reduce the alkali metal content to less than about 4.0 weight percent under conditions described hereinabove. Suitable ions include hydrogen, ammonium and trivalent cations such as the rare earths. If desired, a precursor sodium aluminosilicate may be incorporated in the matrix and initially base exchanged prior to calcination. Generally, it has been found that the acid heat treatment prior to base exchange is unnecessary since zeolitic alkali metal contained in either the aluminosilicate or silica-alumina matrix is removed during the base exchange step.

The catalyst composition after acid treatment or after base exchange is water washed free of soluble matter. The washed product is then dried, suitably in an atmosphere of superheated steam at a temperature of about 150° F. to about 400° F. The dried product is thereafter calcined suitably in an atmosphere of air and/or steam, at a temperature of 800° F. to 1500° F. to yield the finished catalyst.

The particular physical form of the catalyst product will be determined principally by the use to which it is to be subjected. The invention described herein may be employed in preparation of the catalyst in any desired physical form. Thus, the hydrosol containing the crystalline aluminosilicate may be permitted to set in mass to a hydrogel which is thereafter dried and broken into pieces of desired size. The pieces of gel so obtained are generally of irregular shape. Uniformly shaped pieces of gel may be obtained by extrusion or pelleting of the powder-containing hydrogel. Also, the hydrosol may be introduced into the perforations of a perforated plate and retained therein until the sol has set to a hydrogel, after which the formed hydrogel pieces are removed from the plate. The method of the invention is especially useful as applied to the manufacture of spherically shaped gel particles produced by introducing drops of hydrosol into a water-immiscible liquid wherein the hydrosol sets to spheroidal bead-like particles of hydrogel. Larger size spheres are ordinarily within the range of from about $\frac{1}{64}$ to about ¼ inch in diameter, whereas smaller size spheres, which are generally referred to as microspheres, are within the ranges of from about 10 to about 100 microns in diameter. The use of spherically shaped gel particles is of particular advantage in hydrocarbon conversion processes, including the moving catalyst bed process, the fluidized process, etc., in which the spheroidal gel particles are subjected to continuous movement. As applied to the stationary bed, spheroidal gel particles provide effective contact between the reactants and the ultimate catalyst composition by avoiding channeling.

Catalytic hydrocarbon conversion, utilizing the catalyst composition described herein may be carried out at catalytic cracking conditions employing a temperature within the approximate range of 700° F. to 1200° F. and under a pressure ranging from subatmospheric up to several hundred atmospheres. The contact time of the oil with the catalyst is adjusted in any case according to the conditions, the particular oil feed and the particular results desired to give a substantial amount of cracking to lower boiling products.

The following examples illustrate the best mode now contemplated for carrying out the invention.

EXAMPLE 1

Rare earth faujasite (Si/Al=2.6) was prepared by treating sodium faujasite with 240 pounds of an aqueous solution containing 5 percent rare earth chloride hexahydrate and 2 percent ammonium chloride. The treatment was carried out at 180° F. for a period of time sufficient to reduce the sodium content to 1.8 weight percent Na. The resulting product was washed and then calcined ten hours at 1000° F. A quantity of such aluminosilicate was dispersed in a sodium silicate solution as follows.

A. Sodium silicate solution:
  8.21 lbs. sodium silicate ($Na_2O/SiO_2=0.3/1$)
  5.47 lbs. water
  0.263 lb. of rare earth faujasite Solution A above was mixed with an acid solution of the following composition.

B. Acid solution:
  13.37 lbs. water
  1.62 lbs. of 100% acetic acid

Solution B having a specific gravity of 1.014 at 80° F. and Solution A having a specific gravity of 1.214 at 78° F. were continuously mixed together through a nozzle using 344 cc. per minute of silicate solution and 380 cc. per minute of the acid solution to form a resulting hydrosol having a pH of 6.6. The sol was formed into spheroidal hydrogel beads by introducing globules of the sol into an oil medium. The hydrosol particles set to firm hydrogel beads in 2.2 seconds and contained 90 weight percent $SiO_2$ and 10 weight percent rare earth faujasite on a calculated basis.

After formation the hydrogel beads were water-rinsed free of oil and one gallon of the beads covered with a 2 weight percent aqueous acetic acid solution (½ volume of acid solution/volume hydrogel). The hydrogel was then heat treated in the acid solution at 180° F. for 24 hours. The acid-treated hydrogel was then base-exchanged with 1 percent ammonium chloride continuously for 24 hours. The base-exchanged product was water-washed free of chloride, dried for 20 hours at 450° F. in air and stabilized with steam for 24 hours at 1200° F. under a pressure of 15 p.s.i.g.

EXAMPLE 2

The catalyst of this example was formed in the same manner as in Example 1 except that the treatment with acetic acid was omitted.

EXAMPLE 3

Alpha alumina trihydrate ($\alpha\text{-}Al_2O_3 \cdot 3H_2O$) was milled to a particle size of 1–2 microns in sufficient water to form a 30 percent by weight aqueous slurry of alumina for 72 hours at room temperature (70–80° F.). The resulting slurry was dispersed in an acid as follows.

B. Acid solution:
  8.53 lbs. water
  1.62 lbs. of 100% acetic acid
  4.84 lbs. aqueous slurry
  $\alpha\text{-}Al_2O_3 \cdot 3H_2O$ containing 30 wt. percent $Al_2O_3$ Solution B, having a specific gravity of 1.072 at 77° F. and the silicate solution A of Example 1 were mixed together through a nozzle using 350 cc. per minute of Solution B and 350 cc. per minute of silicate solution to form a hydrosol having a pH of 6.8 which set to hydrogel beads in 1.8 seconds. The hydrosol was formed into bead hydrogel and subsequently treated with acetic acid and ammonium chloride and thereafter washed, dried and steam stabilized in the same manner as that of Example 1.

EXAMPLE 4

The catalyst of this example was formed in the same manner as in Example 3 except that the treatment with acetic acid was omitted.

The above catalysts were tested for catalytic cracking activity by passing thereover a charge of a Mid-Continent gas oil having a boiling range of 450 to 950° F. at a reactor temperature of 900° F., and a LHSV of 4.0. The results obtained are presented in Table I and also compared to the cracking selectivity of a silica-alumina cracking catalyst containing about 10 weight percent $Al_2O_3$ and 90 weight percent $SiO_2$. The difference (Δ values) shown hereinafter represent the yields given by the present catalysts minus the yields obtained by the conventional catalyst, at the same conversion.

The results obtained show that while the catalysts of Examples 1 and 2 are active, they do not possess the selectivity advantage such as achieved with the catalysts of Examples 3 and 4.

Table 1

| Example No | 1 | 2 | 3 | 4 |
|---|---|---|---|---|
| Forming pH | 6.6 | 6.6 | 6.8 | 6.8 |
| Description: | | | | |
| Matrix | $SiO_2$ | $SiO_2$ | $SiO_2$ | $SiO_2$ |
| Fines: | | | | |
| Type | | | $Al_2O_3 \cdot 3H_2O$ | $Al_2O_3 \cdot 3H_2O$ |
| Conc | | | 25 | 25 |
| Type | REHFj[1] | | REHFj[1] | REHFj |
| Conc | 10 | | 10 | |
| Heat Treat: | | | | |
| Solution | HAc | | HAc | |
| Conc., Wt. percent | 2 | | 2 | |
| Contacts, hrs | ½ v./v. 1-24 hr. at 180° F. | | ½ v./v. 1-24 hr. at 180° F. | |
| Solution | $NH_4Cl$ | $NH_4Cl$ | $NH_4Cl$ | $NH_4Cl$ |
| Conc., Wt. percent | 1 | 1 | 1 | 1 |
| Contacts, hrs | 1-24 hr. cont | 1-24 hr. cont | 1-24 hr. cont | 1-24 hr. cont. |
| Composition: | | | | |
| Na, Wt. percent | 0.07 | 0.05 | 0.11 | 0.09 |
| $(RE)_2O_3$, Wt. percent | 1.15 | 1.36 | 0.89 | 1.25 |
| Physical Properties: | | | | |
| App. Dens., g./cc | 0.56 | 0.59 | 0.50 | 0.56 |
| Surface Area, m.²/g | 321 | 327 | | |
| Catalytic Evaluation: | | | | |
| Conditions: | | | | |
| LHSV | 4 | 4 | 4 | 4 |
| C/O | 1.5 | 1.5 | 1.5 | 1.5 |
| Conv., Vol. percent | 52.6 | 52.2 | 53.6 | 61.0 |
| $C_5$+ Gaso., Vol. percent | 47.5 | 44.7 | 48.4 | 54.1 |
| Total $C_4$'s, Vol. percent | 9.7 | 9.8 | 9.3 | 11.5 |
| Dry Gas, Wt. percent | 4.6 | 4.5 | 4.1 | 4.9 |
| Coke, Wt. percent | 1.5 | 1.7 | 1.1 | 1.0 |
| $H_2$, Wt. percent | 0.01 | 0.03 | 0.02 | 0.02 |
| Delta Advantage Over Si/Al: $C_5$+ Gaso., Vol. percent | +7.3 | +6.6 | +9.4 | +11.1 |

[1] Rare earth acid faujasite.

EXAMPLE 5

This example was prepared in the same manner as Example 2 except that the hydrosol was formed at a pH of 8.4.

EXAMPLE 6

This example was prepared in the same manner as Example 4 except that the hydrosol was formed at a pH of 8.5.

EXAMPLE 7

This example was prepared by dispersing a sodium faujasite (9.6 wt. percent Na, 20.8 wt. percent $Al_2O_3$, 66.8 wt. percent $SiO_2$) in the silicate solution (A) and gelling with acid solution (B) as follows.

A. Sodium silicate solution:
  8.21 lbs. sodium silicate ($Na_2O/SiO_2 = 0.3/1$)
  5.47 lbs. water
  0.263 lb. sodium faujasite Solution A was mixed with an acid solution of the following composition.

B. Acid solution:
  8.53 lbs. water
  1.62 lbs. 10% acetic acid
  4.84 lbs. aqueous slurry
  $\alpha$-$Al_2O_3 \cdot 3H_2O$ containing 30 wt. percent $Al_2O_3$ Table 2

| Example No | 5 | 6 | 7 |
|---|---|---|---|
| Forming pH | 8.4 | 8.5 | 8.5 |
| Description: | | | |
| Matrix | $SiO_2$ | $SiO_2$ | $SiO_2$ |
| Fines: | | | |
| Type | | $Al_2O_3 \cdot 3H_2O$ | $Al_2O_3 \cdot 3H_2O$ |
| Conc | | 25 | 25 |
| Type | REHFj[1] | REHFj | NaFj[2] |
| Conc | 10 | 10 | 10 |
| Heat Treat: | | | |
| Solution | | | $RECl_3 \cdot 6H_2O$ |
| Conc., Wt. percent | | | 2 |
| Contacts, hrs | | | ½ v./v. 1-24 hr. at R.T. |
| Solution | $NH_4Cl$ | $NH_4Cl$ | $(NH_4)_2SO_4$ |
| Conc., Wt. percent | 1 | 1 | 1.4 |
| Contacts, hrs | 1-24 hr. continuous | 1-24 hr. continuous | 1-24 hr. continuous |
| Composition: | | | |
| Na, Wt. percent | 0.05 | 0.23 | 0.37 |
| $(RE)_2O_3$, Wt. percent | 1.56 | 1.4 | 2.6 |
| Physical Properties: | | | |
| App. Sens., g./cc | 0.49 | | |
| Surface Area, m.²/g. (Steamed) | 327 | 260 | 290 |
| Catalytic Evaluation: | | | |
| Conditions: | | | |
| LHSV | 4 | 4 | 4 |
| C/O | 1.5 | 1.5 | 1.5 |
| Conversion, Vol. percent | 48.5 | 51.6 | 52.6 |
| $C_5$+ Gasoline, Vol. percent | 41.8 | 46.0 | 48.4 |
| Total $C_4$'s, Vol. percent | 8.9 | 9.3 | 8.3 |
| Dry Gas, Wt. percent | 4.3 | 4.2 | 3.7 |
| Coke, Wt. percent | 1.5 | 1.0 | 1.2 |
| $H_2$, Wt. percent | 0.03 | 0.02 | 0.01 |
| Delta Advantage Over Si/Al: $C_5$+ Gasoline, Vol. percent | +5.9 | +8.3 | +10.0 |

[1] Rare earth acid faujasite.
[2] Sodium faujasite.

Solutions A and B were continuously mixed through a nozzle using 398 cc. per minute of each solution. The resulting hydrosol having a pH of 8.5 was formed into spheroidal hydrogel beads using conventional bead forming techniques. After formation the hydrogel beads were base exchanged at room temperature for 16 hours by contact with an aqueous solution containing 2% rare earth chloride hexahydrate (½ volume rare earth solution/volume hydrogel). The rare earth treated hydrogel was then base exchanged with 1.4 percent ammonium sulfate continuously for 24 hours. The resulting product was washed, dried for 20 hours at 450° F. in air and stabilized with steam for 24 hours at 1200° F. under a pressure of 15 p.s.i.g.

It will be seen from the data of Table 2 (Col. 12) that the catalysts of Examples 5 to 7, which were prepared from a hydrosol having a pH of 8.4 to 8.5, show superior catalytic performance over Examples 1 and 2. When compared to silica-alumina these catalysts provide a $C_5+$ gasoline advantage as much as 10 vol. percent.

EXAMPLE 8

Rare earth acid faujasite (Si/Al=2.8) was prepared by treating sodium faujasite with an aqueous solution containing 5 percent rare earth chloride hexahydrate and 2 percent ammonium chloride. The treatment was carried out at 180° F. for a period of time sufficient to reduce the sodium content to 2.06 weight percent. The resulting product was washed, calcined in air for 10 hours at 1000° F. and dispersed in a sodium silicate solution as follows.

A. Sodium silicate solution:
    16.42 lbs. sodium silicate (8.9 wt. percent $Na_2O$, 28.9 wt. percent $SiO_2$, 62.2 wt. percent water)
    10.94 lbs. water
    0.526 lb. rare earth acid faujasite
    Specific gravity at 76° F.=1.234.

Solution A above was mixed with an acid solution having the following composition.

B. Acid solution:
    17.94 lbs. water
    2.45 lbs. of 97.6 wt. percent sulfuric acid
    9.73 lbs. aqueous slurry
    $\alpha\text{-}Al_2O_3 \cdot 3H_2O$ containing 30 wt. percent $Al_2O_3$
    Specific gravity at 82° F.=1.122

Solutions A and B were mixed together through a mixing nozzle adding 378 cc. per minute of silicate solution at 57° F. to 392 cc. per minute acid solution at 39° F. forming a hydrosol having a pH of 6.95. The sol was formed into spheroidal hydrogel beads by introducing globules of the sol into an oil medium. The hydrosol particles set to firm hydrogel beads in 3.4 seconds at 58° F. After formation the hydrogel beads were water-rinsed free of oil and base-exchanged with 1 percent ammonium chloride continuously for 24 hours. The resulting product was washed free of chloride, dried for 16 hours at 450° F. in air, calcined 10 hours at 1000° F. and stabilized with steam for 24 hours at 1200° F. under a pressure of 15 p.s.i.g.

EXAMPLE 9

The catalyst of this example was formed in the same manner as in Example 8 except that the hydrogel beads were pretreated with a 2 weight percent aqueous acetic acid solution (½ volume of acid solution/volume of hydrogel) for 24 hours at 180° F.

EXAMPLE 10

The catalyst of this example was formed in the same manner as in Example 8 except that the hydrogel beads were pretreated with a 1 weight percent aqueous hydrochloric acid solution (½ volume of acid solution/volume of hydrogel) for 24 hours at 180° F.

EXAMPLE 11

The catalyst of this example was formed in the same manner as in Example 8 except that the hydrogel beads were pretreated with a 1 weight percent aqueous sulfuric acid solution (½ volume of acid/volume of hydrogel) for 24 hours at 180° F.

EXAMPLE 12

The catalyst of this example was formed in the same manner as in Example 8 except that the hydrogel beads were pretreated with an aqueous solution saturated with $CO_2$ (½ volume of $CO_2$ solution/volume of hydrogel) for 24 hours at 180° F.

EXAMPLE 13

Manganese acid faujasite was prepared by treating a crystalline sodium faujasite (Si/Al=2.6) with a combined aqueous solution of 2 weight percent manganese chloride tetrahydrate and 1 weight percent ammonium chloride. The treatment was carried out at 180° F. for a period of time sufficient to reduce the sodium content to 1.25 wt. percent Na. The product was washed free of chloride, dried and calcined in air for 10 hours at 1000° F. The aluminosilicate was dispersed in a sodium silicate solution as follows.

A. Sodium silicate solution:
    16.42 lbs. sodium silicate (8.9 wt. percent $Na_2O$, 28.9 wt. percent $SiO_2$, 62.2 wt. percent water)
    10.94 lbs. water
    0.526 lb. manganese acid faujasite Solution A was mixed with an acid solution having the following composition.

B. Acid solution:
    17.94 lbs. water
    2.45 lbs. of 97.6 wt. percent sulfuric acid
    9.73 lbs. aqueous slurry $\alpha\text{-}Al_2O_3 \cdot 3H_2O$ Solutions A and B were mixed together through a mixing nozzle as in Example 8, forming a hydrosol having a pH of 7.1. The sol was formed into spheroidal hydrogel beads, water-rinsed free of oil and covered with a 2 weight percent aqueous acetic acid solution (½ volume of acid solution/volume hydrogel). The hydrogel was then heat treated in the acid solution for 24 hours at 180° F. and subsequently base-exchanged with 1 percent ammonium chloride continuously for 24 hours. The resulting product was washed free of chloride, dried for 20 hours at 450° F. in air and stabilized with steam for 24 hours at 1200° F. under a pressure of 15 p.s.i.g.

EXAMPLE 14

The catalyst of this example was prepared in the same manner as Example 13 except that the treatment with acetic acid was omitted.

The data presented in Table 3, Examples 8 to 12, show that excellent results can be obtained through use of rare earth acid faujasite as the crystalline aluminosilicate. The catalysts may optionally be pretreated in hot acid solution prior to base exchange. Examples 13 and 14 illustrate the use of manganese acid aluminosilicates as the active catalyst component.

Table 3

| Example No. | 8 | 9 | 10 | 11 | 12 | 13 | 14 |
|---|---|---|---|---|---|---|---|
| Forming pH | 6.95 | 6.95 | 6.95 | 6.95 | 6.95 | 7.1 | 7.1. |
| Description: | | | | | | | |
| Matrix | $SiO_2$ (100%) | | | | | $SiO_2$ (100%) | |
| Fines: | | | | | | | |
| (1) Type | REHFj[1] | | | | | MnHFj[2] | |
| Conc. | 10 | 10 | 10 | 10 | 10 | 10 | 10. |
| (2) Type | $Al_2O_3 \cdot 3H_2O$ | $Al_2O_3 \cdot 3H_2O$ | $Al_2O_3 \cdot 3H_2O$ | $Al_2O_3 \cdot 3H_2O$ | $Al_2O_3 \cdot 3H_2O$ | $Al_2O_3 \cdot 3H_2O$ | $Al_2O_3 \cdot 3H_2O$. |
| Conc. | 25 | 25 | 25 | 25 | 25 | 25 | |
| Heat Treat | | 24 hrs. at 180° F. | 24 hrs. at 180° F. | 24 hrs. at 180° F. | 24 hrs. at 180° F. | 24 hrs. at 180° F. | |
| Solution | | HAc | HCl | $H_2SO_4$ | $CO_2$ | HAc | |
| Conc., Wt. percent | | 2 | 1 | 1 | Sat. | 2 | |
| Contacts (No. X Hrs.) | | ½ v./v. | ½ v./v. | ½ v./v. | | 1-24 hr. | |
| Base Exchange: | | | | | | | |
| Solution | $NH_4Cl$ | $NH_4Cl$ | $NH_4Cl$ | $NH_4Cl$ | $NH_4Cl$ | $NH_4Cl$ | $NH_4Cl$. |
| Conc., Wt. percent | 1 | 1 | 1 | 1 | 1 | 1 | 1. |
| Contacts (Hrs.) | 1-24 hr. continuous. | 1-24 hr. continuous. | 1-24 hr. continuous. | 1-24 hr. continuous. | 1-24 hr. continuous. | 1-24 hr. continuous. | 1-24 hr. continuous. |
| Composition: | | | | | | | |
| Na, Wt. percent | 0.08 | | 0.07 | 0.11 | 0.10 | 0.09 | 0.13. |
| $(RE)_2O_3$, Wt. percent | 1.28 | 0.87 | 0.64 | 0.92 | 1.03 | | |
| Catalytic Evaluation: | | | | | | | |
| Conditions: | | | | | | | |
| LHSV | 4 | 4 | 4 | 4 | 4 | 4 | 4. |
| C/O | 1.5 | 1.5 | 1.5 | 1.5 | 1.5 | 1.5 | 1.5. |
| Conversion Vol. percent | 64.9 | 63.6 | 58.4 | 60.5 | 53.9 | 39.7 | 39.5. |
| $C_5+$ Gaso., Vol. percent | 54.6 | 53.6 | 50.2 | 52.5 | 46.2 | 34.4 | 34.5. |
| Total $C_4$'s, Vol. percent | 13.9 | 13.9 | 11.9 | 12.1 | 10.6 | 7.8 | 7.4. |
| Dry Gas, Wt. percent | 5.8 | 6.1 | 5.2 | 5.1 | 5.1 | 3.5 | 3.8. |
| Coke, Wt. percent | 1.9 | 1.6 | 1.3 | 1.2 | 1.4 | 1.3 | 0.9. |
| $H_2$, Wt. percent | 0.03 | 0.03 | 0.02 | 0.02 | 0.02 | 0.07 | 0.01. |
| Delta Advantage Over Si/Al: | | | | | | | |
| $C_5+$ Gaso., Vol. percent | +9.7 | +9.3 | +8.5 | +9.8 | +7.1 | +3.8 | +4.0. |

[1] Rare earth acid faujasite.
[2] Manganese acid faujasite.

EXAMPLE 15

This catalyst was prepared in the same manner as Example 13 except that the active aluminosilicate was an acid faujasite prepared by treating sodium faujasite (Si/Al=2.7)

with ammonium chloride at 180° F. until the sodium content was reduced to 0.04 wt. percent. The resulting product was washed free of chloride, dried and calcined 10 hours at 1000° F.

EXAMPLE 16

The catalyst of this example was prepared in the same manner as Example 15 except that the treatment with acetic acid was omitted.

EXAMPLE 17

This catalyst was prepared as in Example 9 except that McNamee clay was employed in place of α-alumina trihydrate.

EXAMPLE 18

This catalyst was prepared as in Example 17 except that the treatment with acetic acid was omitted.

EXAMPLE 19

Alpha alumina trihydrate ($\alpha$-$Al_2O_3 \cdot 3H_2O$) was milled in sufficient water to form a 20 percent by weight aqueous slurry of alumina for 72 hours at room temperature (70–80° F.). The resulting slurry contained finely divided alumina having a weight mean particle diameter of 1.46 microns. A quantity of such slurry was dispersed in a solution of sulfuric acid as follows.

A. Acid-alumina fines solution:
(1)
4.42 lbs. of 96.7 $H_2SO_4$
20.6 lbs. of $H_2O$
(2)
17.59 lbs. aqueous slurry
$\alpha$-$Al_2O_3 \cdot 3H_2O$ containing 20 percent wt. $Al_2O_3$
11.79 lbs. $H_2O$ Solution 2 was added slowly to Solution 1 while agitating vigorously to prevent agglomeration of the fines.

Solution A above was mixed with an aqueous sodium silicate solution characterized by the following composition.

B. Silicate solution:
33.0 lbs. of sodium silicate containing 28.85 wt. percent $SiO_2$
22 lbs. of $H_2O$ Four hundred (400) cc./min. of the silicate solution were contacted with 392 cc./min. of the acid-fines solution in a mixing nozzle, forming a hydrosol having a pH of 8.4. The resulting hydrosol was introduced in the form of globules into a water-immiscible oil medium wherein the globules set to hydrogel beads. After formation the hydrogel beads were water-rinsed free of oil and covered with a 2 weight percent aqueous sulfuric acid solution (½ volume of acid solution/volume hydrogel). The hydrogel was then heat-treated in the acid solution at 200° F. for 3 hours. The acid-treated hydrogel was base-exchanged continuously with ammonium chloride and thereafter water-washed free of chloride.

Fifteen hundred and eighty-three (1583) grams of the hydrogel prepared above, having 14.2 wt. percent solids, was blended with 30.4 grams of rare earth faujasite[1] (82.2 wt. percent solids) and 1000 cc. water by ball milling overnight (approximately 16 hours). The milled slurry was then dried for 24 hours at 230° F. in air, sized to 4 x 10 mesh, calcined 10 hours at 1000° F. and then steam-stabilized for 24 hours at 1200° F. with steam at 15 p.s.i.g.

Catalytic evaluation of this catalyst for cracking gas oil provided a conversion of 42.9 vol. percent and a $C_5+$ gasoline of 37.5 vol. percent. The delta advantage over silica-alumina was +5.0. The data summarized in Table 4 illustrate the use of acid faujasite as the active crystalline aluminosilicate (Examples 15–16) and McNamee clay as the source of alumina (Examples 17–18).

[1] Prepared by treating sodium faujasite (Si/Al=1.23) with rare earth chloride hexahydrate at 180° F. for a period of time sufficient to provide a residual sodium content of 1.5 percent by weight.

Table 4

| Example No. | 15 | 16 | 17 | 18 |
|---|---|---|---|---|
| Forming pH | 7.1 | 7.1 | 7.0 | 7.0. |
| Description: | | | | |
| Matrix | $SiO_2$ 100% | $SiO_2$ 100% | $SiO_2$ 100% | $SiO_2$ 100%. |
| Fines: | | | | |
| (1) Type | HY [1] | HY [1] | REHFj [2] | |
| Conc. | 10 | 10 | 10 | 10. |
| (2) Type | $Al_2O_3 \cdot 3H_2O$ | $Al_2O_3 \cdot 3H_2O$ | Clay McNamee | Clay McNamee. |
| Conc. | 25 | 25 | 25 | 25. |
| Heat Treat. | | | 180° F. 24 Hrs. | |
| Solution | HAc | | HAc | |
| Conc., Wt. percent | 2 | | 2 | |
| Contacts, Hrs | 1–16 hrs | | ½ v./v. | |
| Base Exchange: | | | | |
| Solution | $NH_4Cl$ | $NH_4Cl$ | $NH_4Cl$ | $NH_4Cl$. |
| Conc., Wt. percent | 1 | 1 | 1 | 1. |
| Contacts, Hrs | 1–24 hr. continuous. | | 1–24 Hr. | 1–24 Hr. |
| Composition: Na, Wt. percent | 0.07 | 0.10 | 0.05 | 0.08. |
| Catalytic Evaluation Conditions: | | | | |
| LHSV | 4 | 4 | 4 | 4. |
| C/O | 1.5 | 1.5 | 1.5 | 1.5. |
| Conversion, Vol. percent | 46.3 | 47.8 | 55.5 | 46.3. |
| $C_5+$ Gaso. Vol. percent | 40.0 | 41.7 | 49.8 | 39.7. |
| Total $C_4$'s, Vol. percent | 9.3 | 9.5 | 6.8 | 8.5. |
| Dry Gas, Wt. percent | 4.2 | 4.3 | 4.4 | 4.3. |
| Coke, Wt. percent | 1.1 | 1.0 | 1.3 | 1.6. |
| $H_2$, Wt. percent | 0.03 | 0.03 | 0.04 | 0.03. |
| Delta Advantage Over Si/Al: $C_5+$ Gaso., Vol. percent | +5.4 | +6.2 | +9.7 | +5.1. |

[1] Acid faujasite.
[2] Rare earth acid faujasite.

The catalytic compositions prepared in accordance with the invention find extensive utility in a wide variety of hydrocarbon conversion processes including cracking, isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydrocracking, oxidation, polymerization and the like. The catalysts are exceptionally stable and are particularly useful in such of the above and related processes carried out at temperatures ranging from ambient temperatures of 70° F. up to 1400° F., including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000. For dehydrogenation, metals and oxides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, tungsten, chromium, iron, manganese, vanadium, copper, platinum group metals and mixtures thereof may be used in conjunction with the aluminosilicate. Desulfurization of shale distillates and the like may be carried out at temperatures between about 600° F. and 1000° F. under atmospheric or superatmospheric pressures with a space velocity (LHSV) between 0.2 and 50. The specific conditions within these ranges will vary with the feed stock undergoing desulfurization and the product desired.

The catalysts also can be employed for hydrogenation of unsaturated aliphatic hydrocarbons, such as monoolefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 100° F. under a pressure of about 10 to 3000 pounds or more, at a space velocity (LHSV) from about 0.5 to 5.0. The promoters which are normally employed with the aluminosilicate include the oxides of nickel, copper and iron and platinum group metals.

Hydrocracking of heavy petroleum residual stocks, cycle stocks, etc., may be carried out with active aluminosilicates promoted with about 0.05 to 10% by weight of a platinum metal such as platinum, palladium, rhodium, osmium, iridium, and ruthenium or with oxides or sulfides of metals such as cobalt, molybdenum, tungsten, chromium, iron, copper and the like. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10.

The catalysts may be further utilized for the alkylation of aromatic hydrocarbons or phenols and the conversion of olefinic, acetylenic and naphthenic hydrocarbons. Alkylation of aromatics and phenols may be carried out at temperatures between 15° and 850° F. under pressures of 0 to 1000 p.s.i.g. The aromatizing reaction may be effected at temperatures between 350° and 1100° F. under atmospheric or elevated pressures. Other reactions which the catalysts find utility in include isomerization, polymerization, hydrogen transfer and oxidation.

What is claimed:
1. A method for preparing a catalyst composition comprising a crystalline aluminosilicate distributed throughout a matrix composite or silica and alumina which comprises dispersing in a silica sol a crystalline aluminosilicate and an amount corresponding to between about 5 and about 40 percent by weight of a porous material characterized by a surface area of at least 25 square meters per gram selected from the group consisting of (1) alumina and (2) composites of silica and alumina containing at least 40 weight percent alumina, which material has a weight mean particle diameter of between 1 and 5 microns, the concentration and proportions of reactants being such that the resulting silica sol having said finely divided material dispersed therein has a pH of between 6 and 11 and an alumina content corresponding to cogelled alumina of less than about 1.5 weight percent, permitting the resulting sol to set to a hydrogel, base exchanging the resulting hydrogel with a dilute aqueous solution containing an ion capable of replacing zeolitic alkali metal, washing the hydrogel free of water-soluble matter, drying and calcining.

2. The method of claim 1 wherein the crystalline aluminosilicate is present in an amount ranging from 1 to 95% by weight based on the final catalyst composite.

3. The method of claim 1 wherein the crystalline aluminosilicate is faujasite.

4. A method for preparing a catalyst composition which comprises blending a crystalline aluminosilicate with a composite of silica and alumina and thereafter drying and calcining, said composite having been prepared by dispersing in a silica sol an amount corresponding to between about 5 and about 40 percent by weight of a porous material characterized by a surface area of at lease 25 square meters per gram selected from the group consisting of (1) alumina and (2) composites of silica and alumina containing at least 40 weight percent alumina, which material has a weight mean particle diameter of between 1 and 5 microns, the concentration and proportions of reactants being such that the resulting silica sol has a pH of between 6 and 11 and an alumina content corresponding to cogelled alumina of less than about 1.5 weight percent, permitting the resulting sol to set to a hydrogel, base exchanging the resulting hydrogel with a dilute aqueous solution containing an ion capable of replacing zeolitic alkali metal, washing the hydrogel free of water-soluble matter.

5. A method for preparing spheroidal particles of a catalyst comprising a crystalline aluminosilicate distributed throughout a matrix composite of silica and alumina which comprises dispersing in a silica sol a crystalline aluminosilicate and an amount corresponding to between about 5 and about 40 percent by weight of the resulting dry composite of a finely divided porous material characterized by a surface area of at least 25 square meters per gram selected from the group consisting of (1) alumina and (2) composites of silica and alumina containing at least 40 weight percent alumina which material has a weight mean particle diameter of between 1 and 5 microns, the concentrations and proportions of reactants being such that the resulting silica sol having said finely divided material dispersed therein has a pH of between 6 and 11 and an alumina content, corresponding to cogelled alumina of less than about 1.5 weight percent, introducing globules of the resulting hydrosol into a column of water-immiscible liquid wherein the globules of hydrosol set to spheroidal hydrogel, effecting gelation of said spheroidal hydrosol particles, base exchanging the resulting hydrogel with a dilute aqueous solution containing an ion capable of replacing zeolitic alkali metal, washing the spheroidal hydrogel particles free of water-soluble matter, drying and calcining.

References Cited by the Examiner
UNITED STATES PATENTS

| | | | |
|---|---|---|---|
| 2,962,435 | 3/1960 | Fleck et al. | 208—120 |
| 3,120,496 | 2/1964 | Plank et al. | 208—120 |
| 3,140,249 | 7/1964 | Plank et al. | 208—120 |
| 3,140,252 | 7/1964 | Frilette et al. | 208—120 |

DELBERT E. GANTZ, *Primary Examiner.*

ALPHONSO D. SULLIVAN, A. RIMENS, *Assistant Examiners.*

UNITED STATES PATENT OFFICE
CERTIFICATE OF CORRECTION

Patent No. 3,277,018

October 4, 1966

Charles J. Plank et al.

It is hereby certified that error appears in the above numbered patent requiring correction and that the said Letters Patent should read as corrected below.

In the heading to the printed specification, line 4, for "Mobile Oil Corporation" read -- Mobil Oil Corporation --; column 1, line 12, for "Nov. 23" read -- March 23 --; column 6 line 27, for "chlirode" read -- chloride --; column 11, in the footnote to the table, for "Rate" read -- Rare --; column 12, line 43, for "10% acetic acid" read -- 100% acetic acid --; columns 17 and 18, Table 4, under the column heading Example 16, line 13, thereof, for "--------" read -- 1-24 Hr.continuous --.

Signed and sealed this 29th day of August 1967.

(SEAL)
Attest:

ERNEST W. SWIDER
Attesting Officer

EDWARD J. BRENNER
Commissioner of Patents

Disclaimer 3,277,018.—*Charles J. Plank*, Woodbury, and *Edward J. Rosinski*, Almonesson, N.J. SELECTIVE CRACKING CATALYST. Patent dated Oct. 4, 1966. Disclaimer filed Nov. 20, 1968, by the assignee, *Mobil Oil Corporation*.

Hereby disclaims the terminal portion of the term of the patent subsequent to Feb. 4, 1981.

[*Official Gazette April 1, 1969.*]